United States Patent [19]
Gondou et al.

[11] Patent Number: 5,479,388
[45] Date of Patent: Dec. 26, 1995

[54] SERVO CONTROL SYSTEM FOR HEAD RECORDING AND/OR REPRODUCING INFORMATION ON AND/OR FROM RECORDING MEDIUM

[75] Inventors: Hiroyuki Gondou, Chikushino; Kiyoyuki Suenaga, Kasuga; Kouji Muraoka, Kasuga; Shingo Sagata, Kasuga, all of Japan

[73] Assignee: Matsushita Electric Industrial Co., Ltd., Osaka, Japan

[21] Appl. No.: 127,544

[22] Filed: Sep. 28, 1993

[30] Foreign Application Priority Data

Sep. 29, 1992 [JP] Japan .................................. 4-259845

[51] Int. Cl.⁶ .................................................. G11B 7/00
[52] U.S. Cl. ........................ 369/47; 369/124; 369/44.25
[58] Field of Search .................................. 369/32, 44.25, 369/44.27, 44.28, 44.29, 44.32, 47, 44.35, 44.36, 44.11, 44.34, 124; 360/77.04

[56] References Cited

U.S. PATENT DOCUMENTS

| | | | |
|---|---|---|---|
| 4,541,084 | 9/1985 | Oku et al. ........................... | 369/44.25 |
| 4,786,794 | 11/1988 | Doi ....................................... | 369/44.25 |
| 4,795,958 | 1/1989 | Nakamura et al. .................. | 369/44.34 |
| 4,982,394 | 1/1991 | Kanda et al. ........................ | 369/44.32 |
| 5,010,538 | 4/1991 | Takeda et al. ...................... | 369/32 |
| 5,029,150 | 7/1991 | Kiyoshi .............................. | 369/44.25 |
| 5,084,848 | 1/1992 | Deguchi et al. .................... | 369/44.34 |
| 5,086,420 | 2/1992 | Doi ..................................... | 369/44.25 |
| 5,155,716 | 10/1992 | Imanaka et al. .................... | 369/44.32 |
| 5,177,726 | 1/1993 | Terada ................................ | 369/44.34 |
| 5,235,577 | 8/1993 | Ogino ................................. | 369/44.34 |

FOREIGN PATENT DOCUMENTS 1-49131  2/1989  Japan .

Primary Examiner—Georgia Y. Epps
Assistant Examiner—Nabil Hindi
Attorney, Agent, or Firm—Lowe, Price, LeBlanc & Becker

[57] ABSTRACT

A servo control system for controlling position of a readout head such as a magnetic or optical head which records, reproduces or erases information on or from a magnetic or magneto-optical disk. This servo control system includes an actuator for moving the head toward a required position on the disk, a position detecting circuit for detecting a position of the head relative to the disk, and a signal processing circuit for processing an output signal from the position detecting circuit to provide a control signal to the actuator. When a value of the signal from the position detecting circuit falls within a preselected range, a controller deactivates a servo control operation of the signal processing circuit and modifies controlled parameters used in the servo control operation in response to a disturbance such as vibration of the system.

19 Claims, 9 Drawing Sheets

SERVO CONTROL SYSTEM FOR HEAD RECORDING AND/OR REPRODUCING INFORMATION ON AND/OR FROM RECORDING MEDIUM

BACKGROUND OF THE INVENTION

1. Technical Field of the Invention

The present invention relates generally to a servo control system for a head which may be employed for recording, reproducing, or erasing information on or from a magnetic or magneto-optical disk. More particularly, the invention relates to a digital servo control system for a magnetic or optical head wherein error signals generated are processed so as to maintain the head to a desired position as commanded by the servo system.

2. Background Art

An optical disk as well as a magnetic disk is provided with a high density and large capacity storage medium. A track-to-track pitch of the disk is very small (1–2 μm), and the rotating disk is subject to change due to eccentricity or slight surface curvatures thereof. It is therefore, necessary to position an optical spot on a target track on the disk with high accuracy.

Generally, an optical disk device has an optical prism which directs light radiated from a semiconductor laser source to an objective lens integrally formed in an actuator to focus a micro-optical spot on the disk. The positioning control of the optical spot is accomplished by monitoring a focal point of the spot and its position in a radial direction of the disk with an optical detector to servo-control the objective lens actuator. The objective lens actuator is, however, usually movable within a small range of ±0.1 mm to ±1 mm. and is difficult to displace the objective lens toward a desired recording area on the optical disk which has a radius ranging over several tens of millimeter. For overcoming this problem, an arrangement is generally used in a conventional system wherein the objective lens actuator is mounted on a carriage and a linear motor is also attached to the carriage to move the carriage together with the actuator in a radial direction of the disk. This radial movement of the carriage is accomplished with a double-action servo control system. This system is such that the linear motor is activated to move the objective lens greatly, while the objective lens actuator is activated to move same slightly.

Hereinafter, a conventional double-action servo control system will be described with reference to FIGS. 9 to 11.

In past optical head control systems, the servo control using analog signals were usually employed. In recent yeas, with speedup of digital operation, low-cost systems become available and the digital servo control is commonly employed to make digital conversions in part of a servo control loop. The digital servo control is expected to have a further wide range of application in view of the advantages in that it may not be adversely affected with circuit noise or offset in the servo control loop, is free to set or modify various controlled parameters, and has a compact construction with high reliability.

In the optical head control, focusing, tracking, and objective lens-trace servo controls utilize part of control signals of each other, however, have basically different servo control loops respectively. Hereinafter, of the servo control loops, a tracking control circuit for the objective lens actuator will be discussed.

Figure 9:
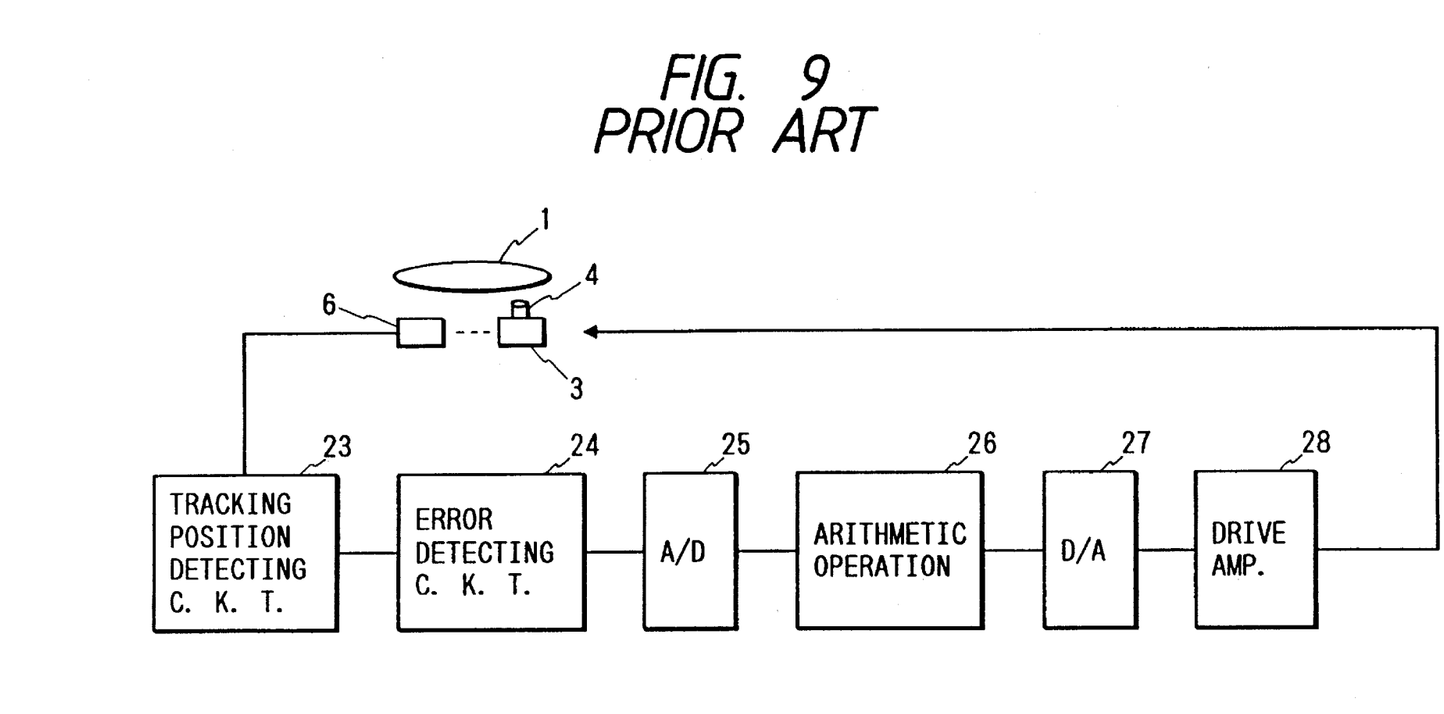
FIG. 9 is a block diagram which shows a prior art circuit arrangement of an optical head servo control system.

FIG. 9 shows a block diagram of the tracking control system. This system includes generally an optical head driving unit 3, an optical unit 6, a track position detecting circuit 23, an error detecting circuit 24, an A/D converter 25, an arithmetic operation circuit 26, a D/A converter 27, and a driving amplifier 28. The optical head driving unit 3 includes an objective lens actuator and a linear motor. The objective lens actuator disposes therein an objective lens 4 which gathers light onto a recording film of an optical disk 1, and is designed to displace the objective lens 4 slightly. The linear motor is operable to move the objective lens 4 together with the objective lens actuator in a direction over a range from an inner periphery and an outer periphery of the optical disk 1. The optical unit 6 includes therein a semiconductor laser, some prisms, and a combination of an optical element and a sensor which monitors tracking errors and focusing errors. The track position detecting circuit 23 converts a light signal provided by the optical element of the optical unit 6 into a position detecting signal indicative of a position of an optical spot relative to a track on the disk 1. The error detecting circuit 24 is responsive to the position detecting signal from the track position detecting circuit 23 to provide a tracking error signal for the tracking servo control which is, in turn, converted by the A/D converter 25 having a sample holder into a digital signal of 5 to 16 bits. This digital signal is processed in the arithmetic operation circuit 26 which is generally provided with a digital signal processor (DSP) and a microprocessor. The signal processed in the circuit 26 is then converted by the D/A converter into an analog signal again, and also converted in the driving amplifier 28 into an actuator driving signal for position control of the objective lens in the radial direction of the disk 1.

Figure 10:
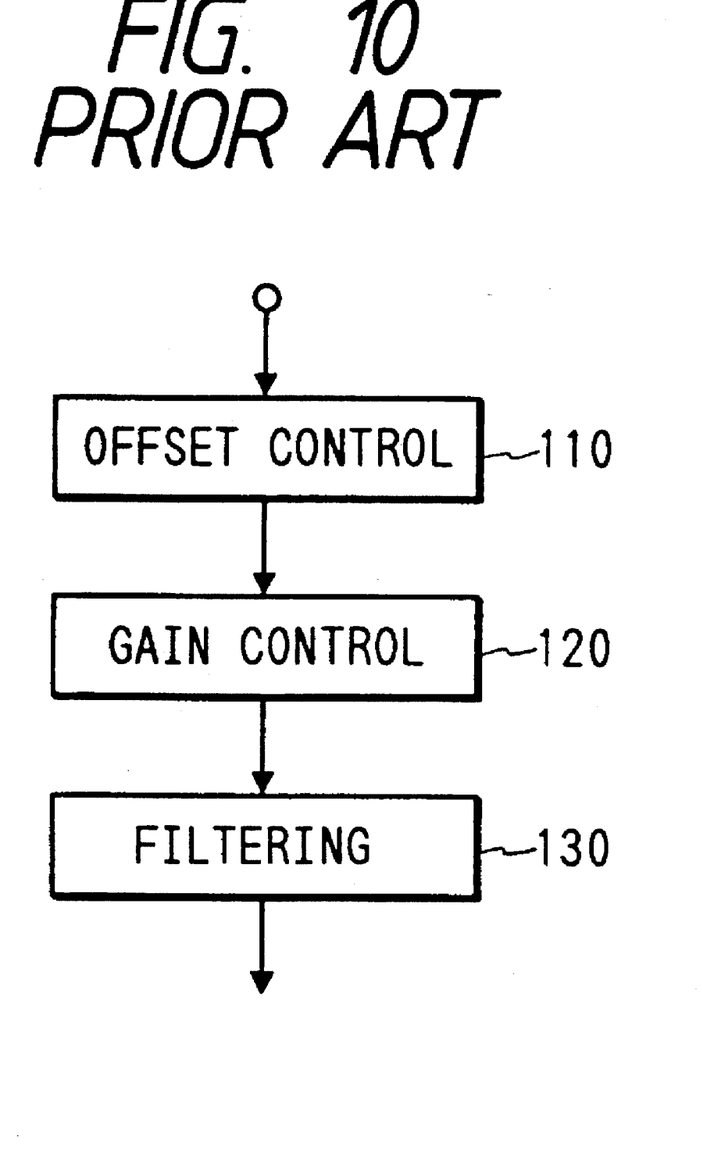
FIG. 10 is a flowchart of a program or sequence of logical steps performed by an arithmetic operation section of a conventional head servo control system.

FIG. 10 shows a flowchart of a program or sequence of logical steps performed by the arithmetic operation circuit 26.

The arithmetic operation circuit 26 performs offset control operation (in step 110), gain control operation (in step 120), and filtering operation (in step 130). The offset control operation is such that an offset of low-frequency (DC) components of the A-D converted digital error signals is modified, and is performed prior to correction of the position detecting signals from the track position detecting circuit 23 and mathematical operation by a digital filter. The gain control operation is to set a loop gain required for the tracking servo control. The filtering operation serves to compensate mechanical properties of the objective lens actuator, and is operable to compensate a phase delay or a phase advance for servo system stability. With these operations, the tracking error signal is converted into a feedback control signal for the objective lens actuator as a control signal for the objective lens 4.

While the above discussion is referred to the tracking servo control circuit, the focusing servo control and the objective lens-trance servo control also utilize similar servo control circuits independently of each other. However, provision of an arithmetic operation circuit for each control circuit requires microprocessors of the same number as the control circuits, resulting in increased system costs as well as a bulky circuit.

Figure 11:
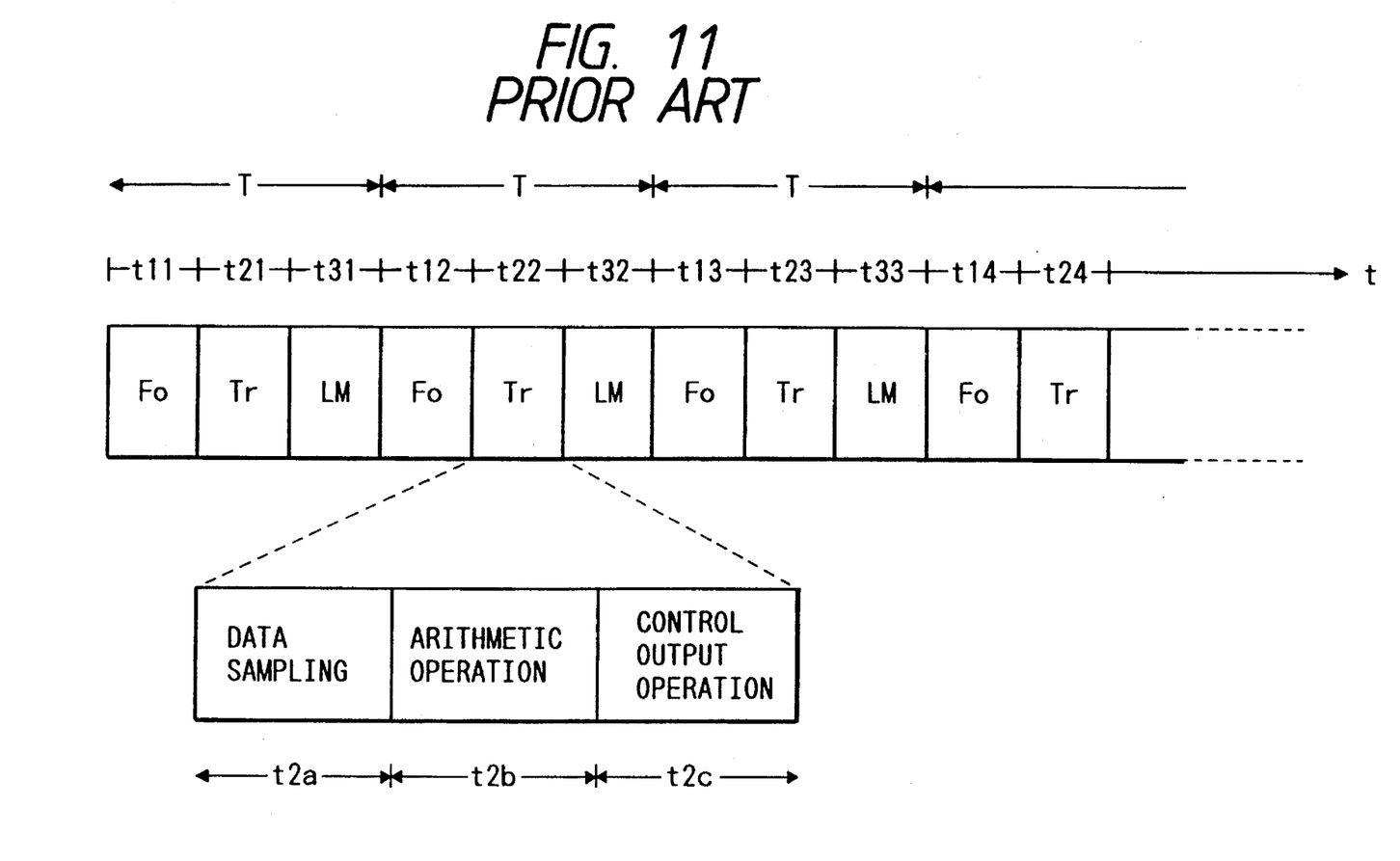
FIG. 11 is an operational block diagram which shows a sequence of control operations of an arithmetic operation section of a conventional head servo control system.

FIG. 11 shows an example of arithmetic operations performed in a time-division fashion in the focusing servo control, the tracking servo control, and the objective lens-trace servo control by the linear motor. These three operations are performed at a sampling cycle T. Within the sampling cycle T, $t_{1n}$, $t_{2n}$, and $t_{3n}$ represent operating time periods of the focusing (Fo) servo control, the tracking (Tr)

servo control, and the linear motor (LM) traced servo control respectively. In addition, within the time period $t_{2n}$, $t_{2a}$, $t_{2b}$, and $t_{2c}$ represent operating time periods of a data sampling operation such as A/D conversion, an arithmetic operation, and an output operation such as D/A conversion. With this time-division control, the three servo control operations are simultaneously performed in a single arithmetic operation circuit, and an optical head digital servo control system of a simple arrangement may be provided.

In the digital servo control, a sampling frequency depends upon control ability and a type of controlled system. In a conventional data storage optical disk device, an optical disk is turned at 1,800–3,600 rpm. In order to have the objective lens follow displacement of the optical disk due to surface curvatures or eccentricity of the optical disk, a sampling frequency of 20–100 is generally necessary. When the sampling frequency is below these values, it becomes difficult for the objective lens actuator to follow the displacement of the optical disk caused by the surface curvatures or the eccentricity thereof with the result that data cannot be recorded on or reproduced from the optical disk in a correct manner and, in addition, the system may not operate normally. Therefore, it is necessary to set the sampling cycle T to a short cycle of 10 μs. For performing the three operations at the same time within the sampling cycle T of 10 μs, each operation must be done within a period of time of several μs. In recent years, a DSP appears on the market as a high-speed microprocessor. However, it is not always easy to perform the data sampling and arithmetic operations within that period.

As previously mentioned, the digital servo control is generally available for producing high-performance, high-reliability, and simplicity of the optical disk. This is based on the primary factor that it is easy to optimize and modify controlled parameters at any time which are used in the offset control, the gain control, and the filtering operations. The controlled parameters are determined based on recording and reproducing signals, condition signals from such as a temperature sensor arranged around the optical head as well as analysis of the focusing position detecting signal and track position detecting signal derived from the optical element in the optical unit 6. It is therefore, necessary for the arithmetic operation circuit to analysis the recording and reproducing signals and the condition signals and to calculate an optimum controlled parameter.

Further, in addition to the above servo control, the arithmetic operation circuit needs to control circuits of peripheral devices, handle recording and reproducing signals, and monitor a malfunction of the system. In addition, the servo control stability and accuracy require adaptive control to modify controlled parameters of the servo control system sequentially in response to disturbances such as variation in environmental conditions for optimization of the control. This must be done in the arithmetic operation circuit.

However, when the arithmetic operation circuit must devote its almost all operating time only to the servo control of the objective lens and the linear motor, it is difficult to incorporate these control operations to the arithmetic operation circuit. This results in the advantage of the digital servo control being reduced.

SUMMARY OF THE INVENTION

It is therefore a principal object of the present invention to avoid the disadvantages of the prior art.

It is another object of the present invention to provide a servo control system which is applicable to the control of a head operable to record, reproduce, or erase information on or from a magnetic or magneto-optical disk and which includes hardware arrangements capable of performing a plurality of control operations with high accuracy and high reliability.

According to one aspect of the present invention, there is provided a control system which comprises a readout means for reading information out of a recording medium, a driving means for moving the readout means toward a required position on the recording medium, a position detecting means for detecting a position of the readout means relative to the recording medium to provide a signal indicative thereof, a signal processing means for processing the signal from the position detecting means to provide a control signal to the driving means, and a deactivating means for deactivating a signal processing operation of the signal processing means when a value of the signal from said position detecting means falls within a preselected range.

According to another aspect of the present invention, there is provided a control system which comprises a light gathering means for gathering light representing preselected information onto an optical disk, a driving means for displacing the light gathering means relative to the optical disk, a position detecting means for monitoring a position of the driving means relative to the optical disk and providing a signal indicative thereof, a signal processing means responsive to the signal from the position detecting means for providing a control signal to the driving means for displacing the light gathering means to a desired position, and a deactivating means for deactivating an operation of the signal processing means when a value of the signal from the position detecting means falls within a preselected range.

According to a further aspect of the present invention, there is provided a control system which comprises a readout means for reading information out of a disk, a driving means for moving the readout means relative to the disk, a position detecting means for detecting a position of the readout means relative to the disk to provide a signal indicative thereof, a signal processing means for processing the signal from the position detecting means to control the driving means, a deactivating means for deactivating a signal processing operation of the signal processing means when a value of the signal from the position detecting means falls within a preselected range, and a parameter modifying means for modifying a preselected controlled parameter used in a signal processing operation of the signal processing means when the deactivating means deactivates the signal processing operation of the signal processing means.

According to a still further aspect of the present invention, there is provided a control system which comprises a light gathering means for gathering light representing preselected information onto an optical disk, a driving means for displacing the light gathering means relative to the optical disk, a position detecting means for detecting a position of the driving means relative to the optical disk and providing a signal indicative thereof, a signal processing means responsive to the signal from the position detecting means for controlling the driving means to displace the light gathering means to a desired position, a deactivating means for deactivating an operation of the signal processing means when a value of the signal from the position detecting means falls within a preselected range, and a parameter modifying means for modifying a preselected controlled parameter used in the operation of the signal processing means during a time when the deactivating means deactivates the operation of the signal processing means.

According to a yet further aspect of the present invention, there is provided a control system which comprises a light gathering means for gathering light representing preselected information onto an optical disk, a driving means for moving the light gathering means relative to the optical disk, a position detecting means for monitoring a position of the driving means relative to the optical disk at every constant cycle to provide a signal indicative thereof, a converting means for converting the signal output from the position detecting means into a digital signal, a signal processing means for processing the digital signal from the converting means, a driving signal means responsive to a signal processed by the signal processing means to provide a driving signal for the driving means, a comparing means for comparing a value of the digital signal converted by the converting means with a preselected value, a deactivating means for deactivating an operation of the signal processing means according to a comparison result derived by the comparing means, and a parameter modifying means for modifying a preselected controlled parameter used in the operation of the signal processing means during a time when the deactivating means deactivates the operation of the signal processing means.

According to still another aspect of the present invention, there is prodded a method for controlling a position of readout means for reading information out of a recording medium which comprises the steps of detecting a position of said readout means to provide a signal indicative thereof, processing the signal derived in the position detecting step according to a preselected operation when the detected position of the readout means is out of a predetermined range, moving the readout means according to a value of the signal processed in the signal processing step, deactivating an operation in the signal processing step when the detected position of the readout means falls within the predetermined range, and modifying a preselected controlled parameter used in the operation in the signal processing step when the operation in the signal processing step is deactivated in the deactivating step.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
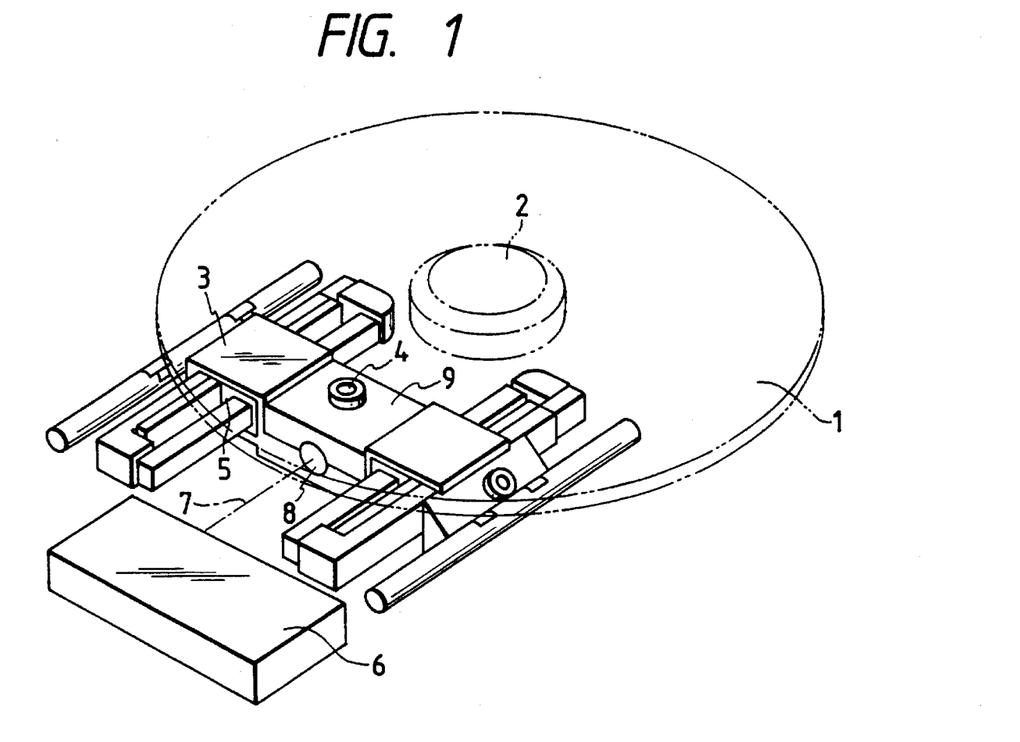
FIG. 1 is a perspective view which shows an optical disk device to which the present invention is applicable.

Referring now to the drawings, particularly to FIG. 1, there is shown an optical head servo control system according to the present invention. This servo control system includes generally a spindle motor 2, an optical head driving unit 3, and an optical unit 6. The spindle motor 2 is designed for rotatably supporting an optical disk 1. The optical head driving unit 3 includes an actuator 10, as will be described in detail in FIG. 2, and a linear motor 5. The actuator disposes therein an objective lens 4 which gathers light onto a recording film of the optical disk 1, and is arranged to move the objective lens 4 along a given path of travel. The linear motor is arranged to displace a carriage 9 supporting the actuator so that the objective lens 4 can be displaced over tracks formed between an inner periphery and an outer periphery of the optical disk 1. The optical unit 6 is fixed on a chassis (not shown), and includes therein a semiconductor laser, some prisms, and a combination of an optical element and a sensor which monitors tracking errors and focusing errors to provide signals indicative thereof. The optical unit 6 emits light so that it is propagated along an optical path 7 into the optical head driving unit 3 through an entrance window 8 and then reflected upward by a mirror (not shown) into the objective lens 4 to form a micro-spot on the optical disk 1. The reflected light from the optical disk 1 is returned back to the optical unit 6 through the objective lens 4 and the entrance window 8 so that information signals in the reflected light are detected by an optical detector provided in the optical unit 6 and a focusing position and a tracking position are also monitored.

Figure 2:
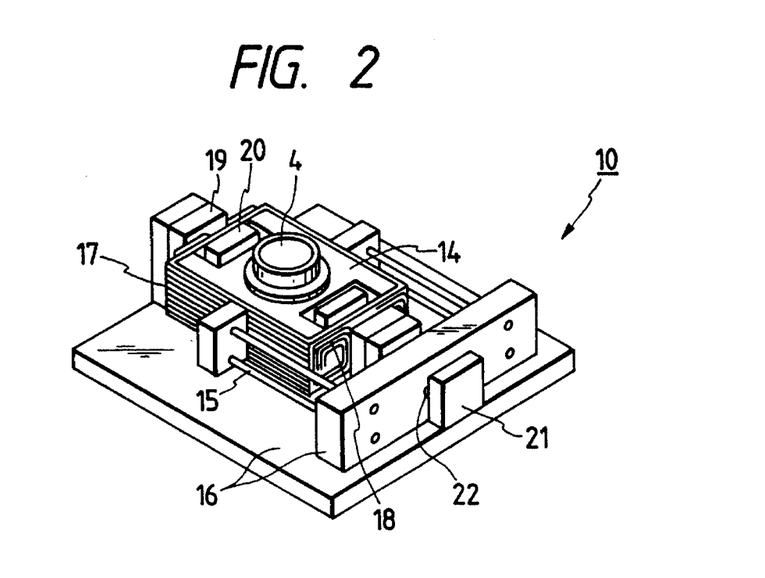
FIG. 2 is an exploded perspective view which shows a objective lens actuator used in an optical disk device, as shown in FIG. 1.

Referring to FIG. 2, the objective lens actuator 10 is shown which is disposed within the carriage 9. The objective lens 4 is, as can be seen in the drawing, secured to a bobbin 14 which is supported on a base plate 16 through springs 15. A permanent magnet 19 and a yoke 20 are also arranged on the base plate 16 to provide a magnetic circuit for a focusing drive coil 17 and a tracking drive coil 18 which are wound around the bobbin 14. When the focusing drive coil 17 is energized in response to a focusing servo control signal, as will be described hereinafter in detail, it will cause the objective lens 4 to move in a focusing direction through the bobbin 14, while, when the tracking drive coil 18 is energized in response to a tracking servo control signal, it will cause the objective lens 4 to move in a tracking direction.

Usually, the rotating optical disk 1 tends to vibrate slightly due to surface curvatures or eccentricity thereof. Such vibration is controlled in a manner wherein the objective lens actuator 10 is driven to move the objective lens 4 based on a focusing position detecting signal or a tracking position detecting signal derived from the optical detector provided in the optical unit 6 to locate an optical spot in place on the disk 1. When moving the optical spot greatly in a radial direction of the disk 1 as in an access operation, the linear motor 5, as shown in FIG. 1, is activated to have the carriage 9 follow the movement of the objective lens 4. This position control is accomplished based on a detection signal from an objective lens position sensor 21, as shown in FIG. 2, in the following manner. The objective lens position sensor 21 includes an LED (Light Emitting Diode) 22 to radiate light to the bobbin 14 to monitor a position of the bobbin 14 based on the light reflected therefrom, and provides a detection signal indicative of the objective lens position. Based on this detection signal, a positional deviation of the objective lens 4 from a preselected neutral position in the carriage 9 (i.e., a positional relation between the objective lens 4 and the carriage 9) is determined. The linear motor 5 is then controlled in response to a linear motor servo control signal, as will be described later, to move the carriage 9 to compensate the positional deviation of the objective lens 4. In this manner, the carriage 9 is followed to the movement of the objective lens 4, which makes it appear that the objective lens 4 is displaced by the carriage 9.

Figure 3:
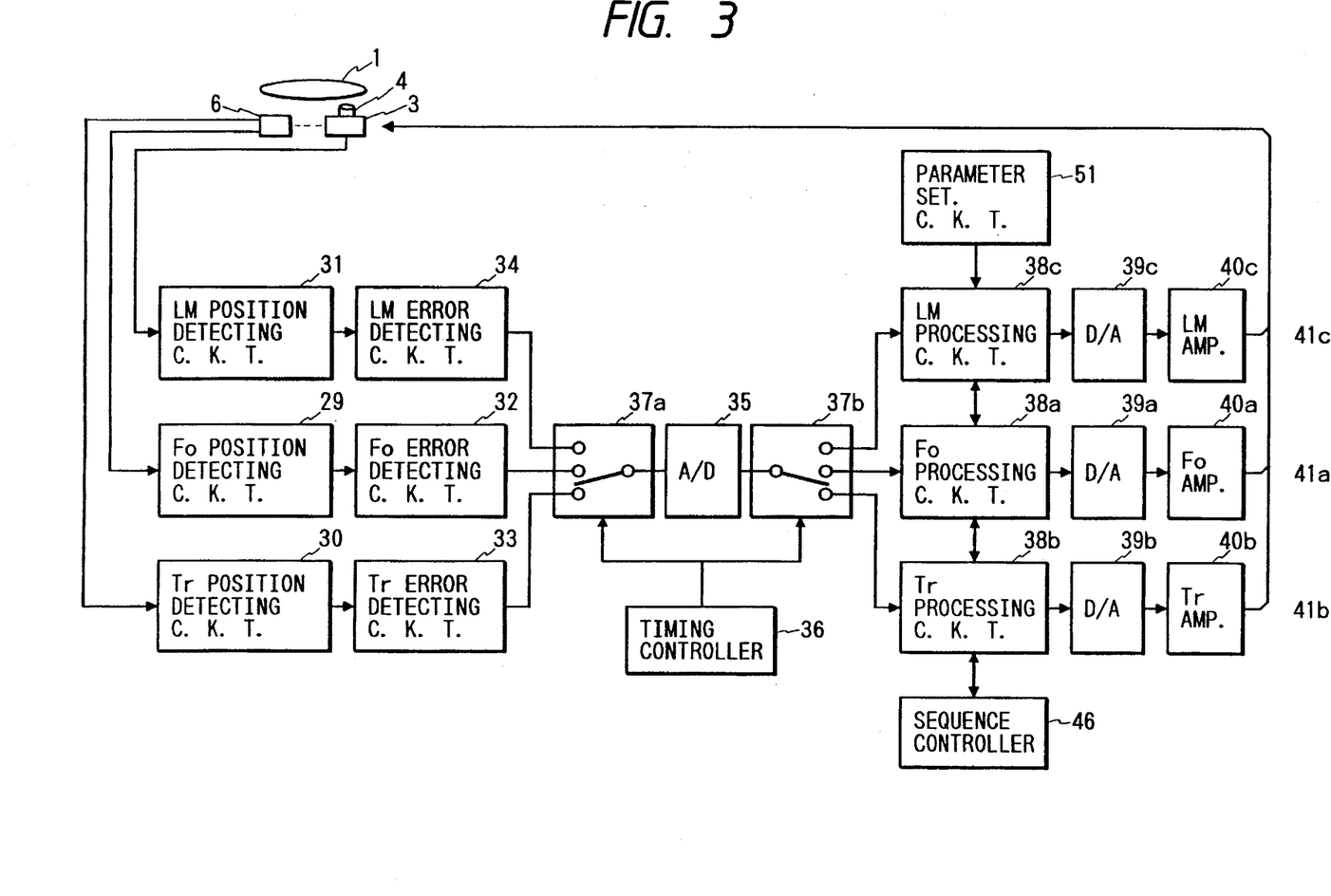
FIG. 3 is a block diagram which shows a circuit arrangement of an optical head servo control system according to the present invention.

Referring to FIG. 3, there is shown an optical head servo control unit. This servo control unit includes a focusing position detecting circuit (Fo circuit) 29, a track position detecting circuit (Tr circuit) 30, and a linear motor position detecting circuit (LM circuit) 31. The focusing position detecting circuit 29 is operable to convert an optical signal detected by the optical detector provided in the optical unit 6 into a position detecting signal indicative of a position of a focal point of an optical spot relative to a recording surface of the optical disk 1. The tracking position detecting circuit 30 is designed to convert the optical signal detected by the optical detector into a position detecting signal indicative of a relative position of the optical spot with respect to a track defined on the optical disk 1. The linear motor position detecting circuit 31 is constructed to convert an output signal from the objective lens position sensor 21 into a position detecting signal indicative of a relative position of the bobbin 14 with respect to the carriage 9. These position detecting signals are then converted by a focusing error detecting circuit 32, a tracking error detecting circuit 33, and a linear motor error detecting circuit 34 respectively into error signals for each servo control, and are inputted to an A/D converter 35 through a switching circuit 37a. The switching circuit 37a is responsive to a control signal from a timing controller 36 to selectively establish electrical communication between the A/D converter 35 and the focusing error detecting circuit 32, the tracking error detecting circuit 33, and the linear motor error detecting circuit 34 with preselected timing. The A/D converter 35 then converts the three error signals into a digital signal in a time-division fashion. The converted digital signal is then selectively fed to a focusing control signal processing circuit 38a, a tracking control signal processing circuit 38b, and linear motor control signal processing circuit 38c according to switching operation of a switching circuit 37b. In these processing circuits, the so-called offset, gain, and filtering control operations are performed. These operations are controlled by a sequence controller 46. In addition, a controlled parameter setting circuit 51 is provided to set or correct controlled parameters (i.e., an offset value, a gain value, and a phase correction value) used in the operations of the processing circuits 38a, 38b, and 38c, respectively. D/A converters 39a, 39b, and 39c are arranged to convert the signals processed by the processing circuits 38a, 38b, and 39c into analog signals respectively to provide a focusing servo control signal 41a, a tracking servo control signal 41b, and a linear motor servo control signal 41c through a focusing amplifier 40a, a tracking amplifier 40b, and a linear motor amplifier 40c to the optical head driving unit 3.

Figure 4:
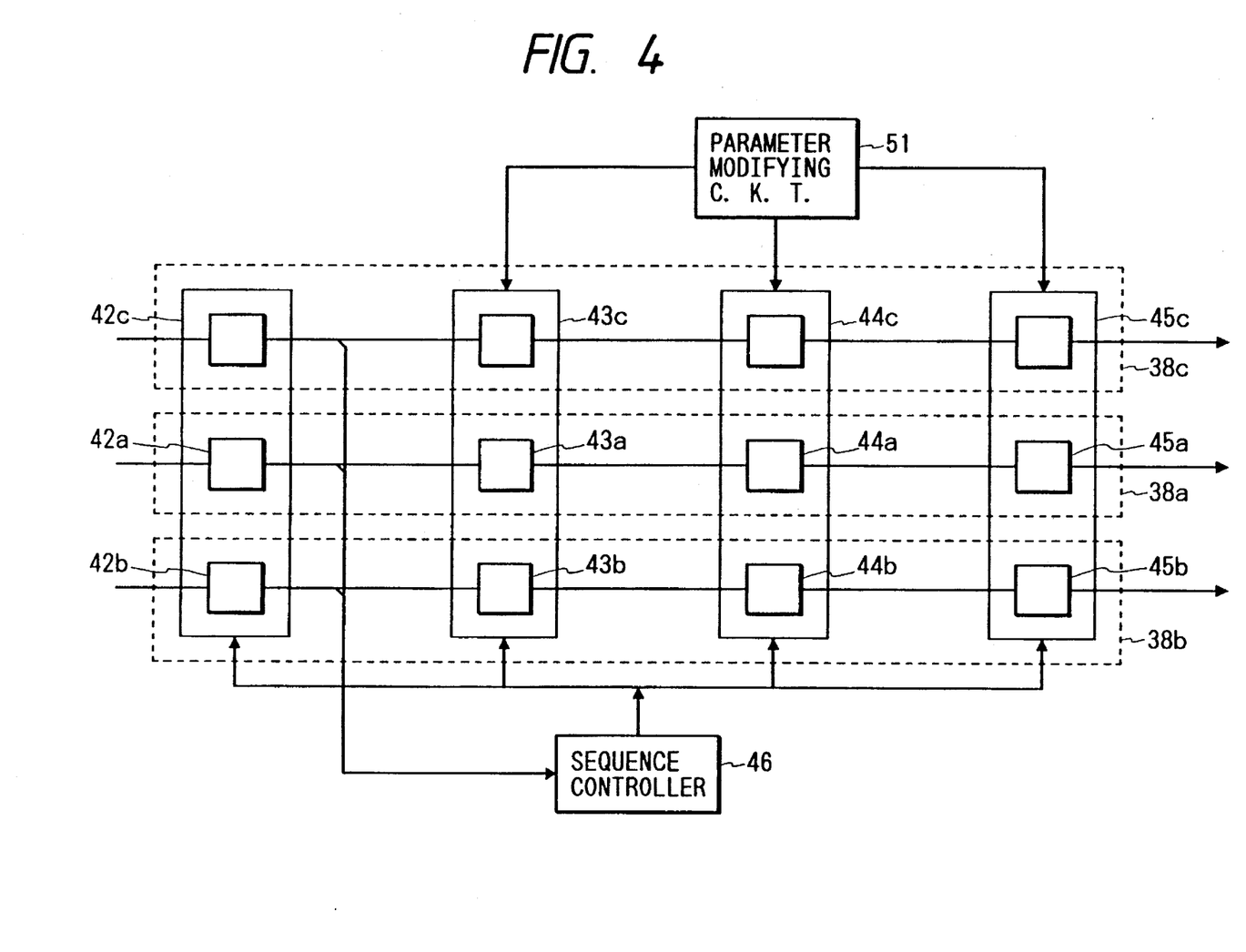
FIG. 4 is a block diagram which shows a signal processing circuit of an optical head servo control system of the invention.

Referring to FIG. 4, circuit arrangements of the focusing control signal processing circuit 38a, the tracking control signal processing circuit 38b, and the linear motor control signal processing circuit 38c are shown.

As seen in the drawing, the focusing control signal processing circuit 38a includes a comparator 42a, an offset control circuit 43a, a gain control circuit 44a, and a filter 45a. The comparator 42a is operable to determine whether a digital error signal from the A/D converter 35 is within a preselected allowable range or not, and provides a signal indicative thereof to the sequence controller 46. The offset control circuit 43a controls an offset of low-frequency (D C) components of the digital error signal from the A/D converter 35. The gain control circuit 44a provides a loop gain required for servo control. The filter 45a is designed to compensate a phase advance or a phase delay to control mechanical characteristics of the objective lens actuator 10 for servo system operation stability.

Similarly, the tracking control signal processing circuit 38b includes a comparator 42b, an offset control circuit 43b, a gain control circuit 44b, and a filter 45b. The linear motor control signal processing circuit 38c also includes a comparator 42c, an offset control circuit 43c, a gain control circuit 44c, and a filter 45c.

Figure 5:
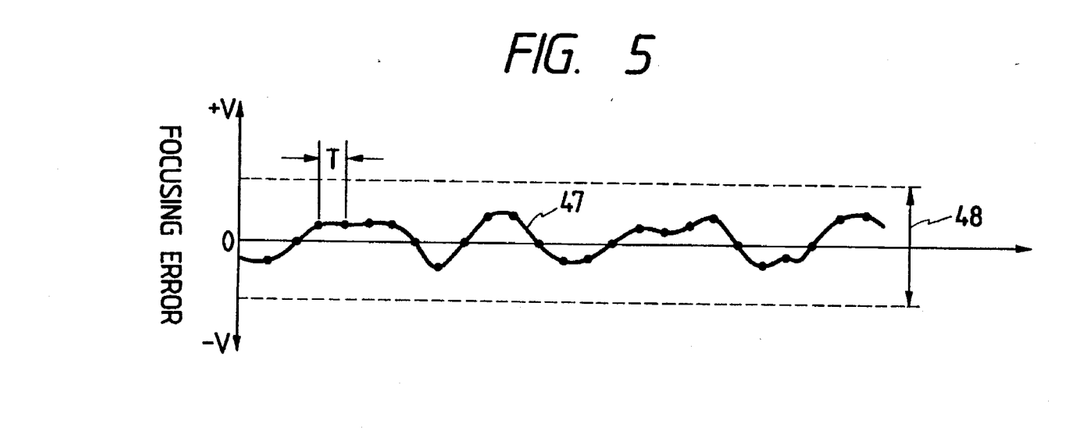
FIG. 5 is a graph which shows a variation in a focusing error signal.

FIG. 5 shows an example of a waveform of a focusing error signal 47 detected by the focusing error detecting circuit 32. The focusing error signal 47 indicates a positional deviation, or misalignment of the objective lens 4 between a desired position and an actual position. The digital servo control system of this invention is designed to effect feedback control to adjust the focusing error signal 47 to zero for compensating the misalignment of the objective lens 4. The digital servo control system samples the focusing error signal 47 at a preselected sampling cycle T to correct it in sequence. In practice, the focusing error signal 47 need not be corrected exactly to zero, but may be corrected to within a preselected allowable range 48 which meets given requirements for recording and reproducing information on and from the optical disk 1. Accordingly, when the sampled data falls within the allowable range 48, the processes following the sampling operation may be omitted to maintain such a controlled condition until a subsequent sampling operation is initiated.

Figure 6:
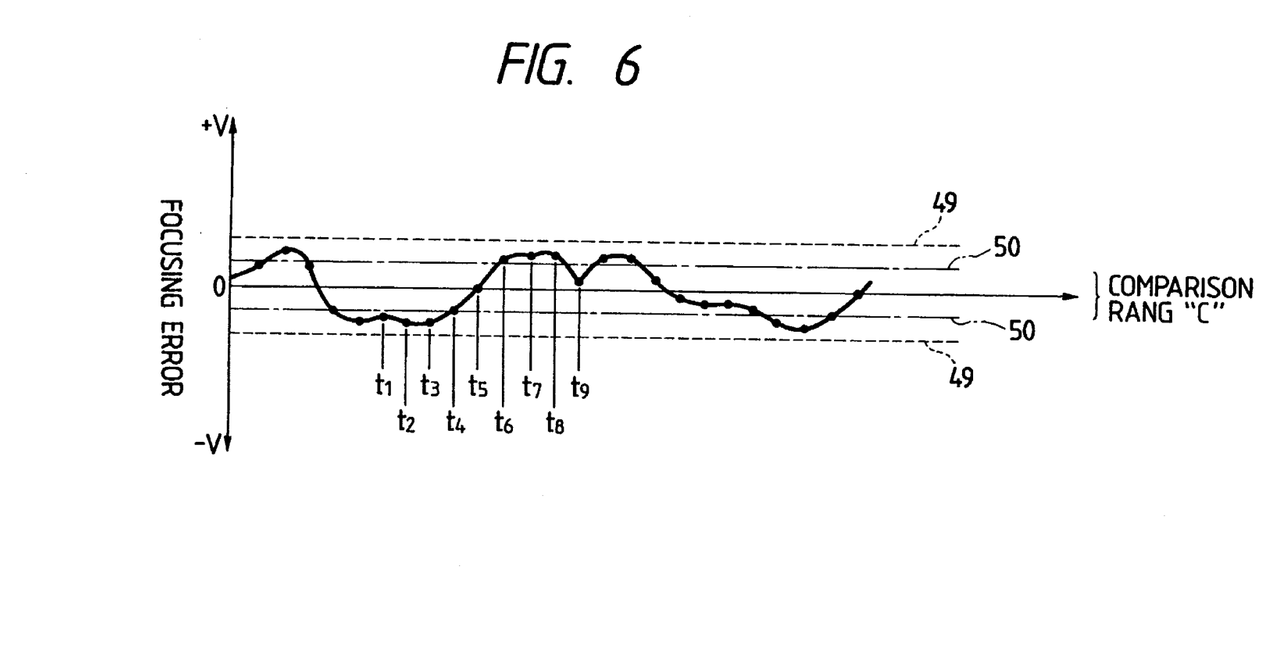
FIG. 6 is a graph which shows a variation in a focusing error signal for explanation of a sampling operation in an optical head servo control system of the invention.
Figure 7:
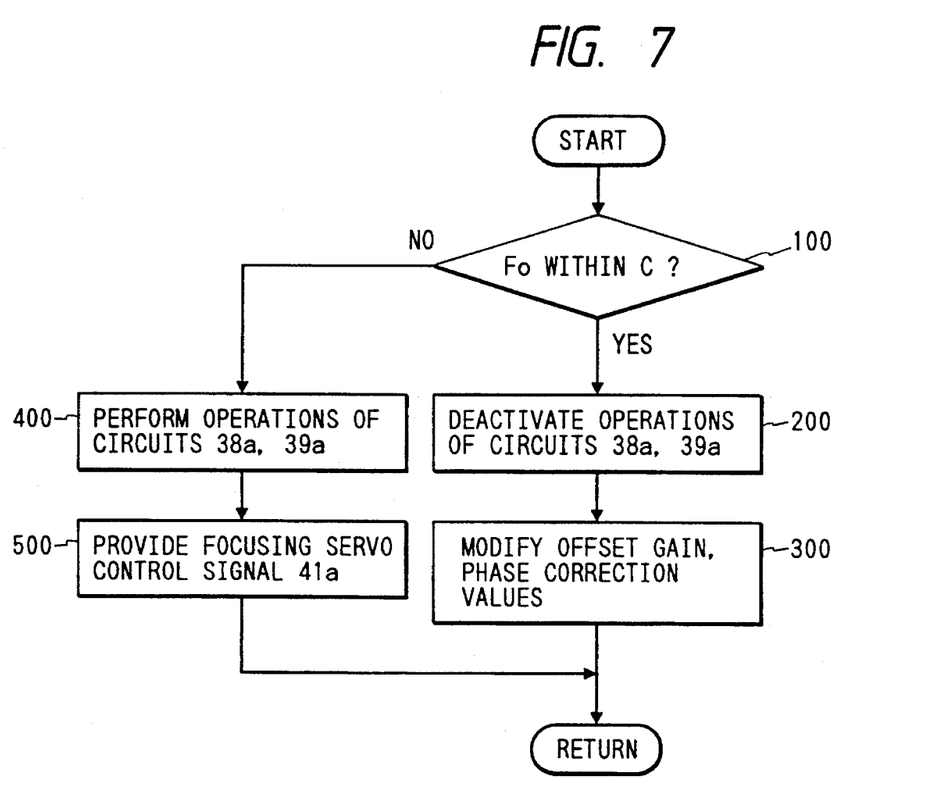
FIG. 7 is a flowchart of a program or sequence of logical steps performed by an arithmetic operation section of an optical head servo control system of the invention.

An operation of the focusing control signal processing circuit 38a in the digital servo system of the invention will be discussed with reference to FIGS. 6 and 7. FIG. 6 shows an variation in the focusing error signal 47. The numerals 49 denote upper and lower limits respectively which define an allowable range of the variation in the focusing error signal. The numerals 50 denote upper and lower reference values of the comparator 42a whose absolute values are smaller than those of the upper and lower limits 49 respectively. The comparator 42a determines whether the focusing error signal Fo falls within a comparison range C defined by the upper and lower reference values 50 or not (in step 100). When the focusing error signal Fo falls within the comparison range C, the sequence controller 46 deactivates the operations of the focusing signal processing circuit 38a and the D/A converter 39a so that the offset, gain, and filtering control operations and the D/A conversion are not performed (in step 200). The focusing amplifier 40a does not provide the focusing servo control signal 41a to the optical head driving unit 3. The control parameter setting circuit 51 then modifies the controlled parameters such as the offset value, the gain value, and the phase correction value according to given condition parameters indicative of a variation in a disturbance such as vibration of the device (in step 300). Alternatively, when the focusing error signal Fo is out of the comparison range C, the sequence controller 46 initiates the operations of the focusing signal processing circuit 38a and the D/A converter 39a (in step 400). The focusing amplifier 40a then provides the focusing servo control signal 41a to the optical head driving unit 3 (in step 500).

Accordingly, at times $t_1$, $t_2$, $t_3$, and $t_4$ in FIG. 6, sampled values of the focusing error signal are out of the comparison range C defined by the upper to lower reference values 50, and the sequence controller 46 activates the focusing signal processing circuit 38a to execute the above mentioned operations. At a time $t_5$, the sampled value falls within the comparison range C, the sequence controller 46 deactivates the focusing signal processing circuit 38a to disrupt its operation while continuing the sampling operation only. At a time $t_6$, similar to at times $t_1$ to $t_4$, the sampled value is out of the comparison range C, the sequence controller 46 activates the focusing signal processing circuit 38a again to resume its operation. It will be noted that when the focusing error signal is within the comparison range C, the unoccupied time wherein the operations of the focusing signal processing circuit 38a and the D/A converter 39a are omitted may be used for another operation.

The above discussion refers to the focusing servo control only for the sake of brevity of disclosure. It should be noted that the present invention is applicable to the tracking servo control and the liner motor servo control independently of each other.

Therefore, when at least one of sampled values of the focusing error signal, the tracking error signal, and the linear motor error signal detected in the focusing error detecting circuit 32, the tracking error detecting circuit 33, and the linear motor error detecting circuit 34 is within a preselected allowable range, the sequence controller 46 deactivates the processing of that signal until the sampled value becomes out of the allowable range. During this period, the controlled parameter setting circuit 51 sets or modifies the controlled parameters used in the offset control circuit (43a, 43b, 43c), the gain control circuit (44a, 44b, 44c), and the filter (45a, 45b, 45c) for optimizing them to compensate changes in actuator and optical characteristics due to the environmental variation such as vibration. Additionally, it is possible to carried out another suitable operation other than the servo control operation in the unoccupied time.

Figure 8:
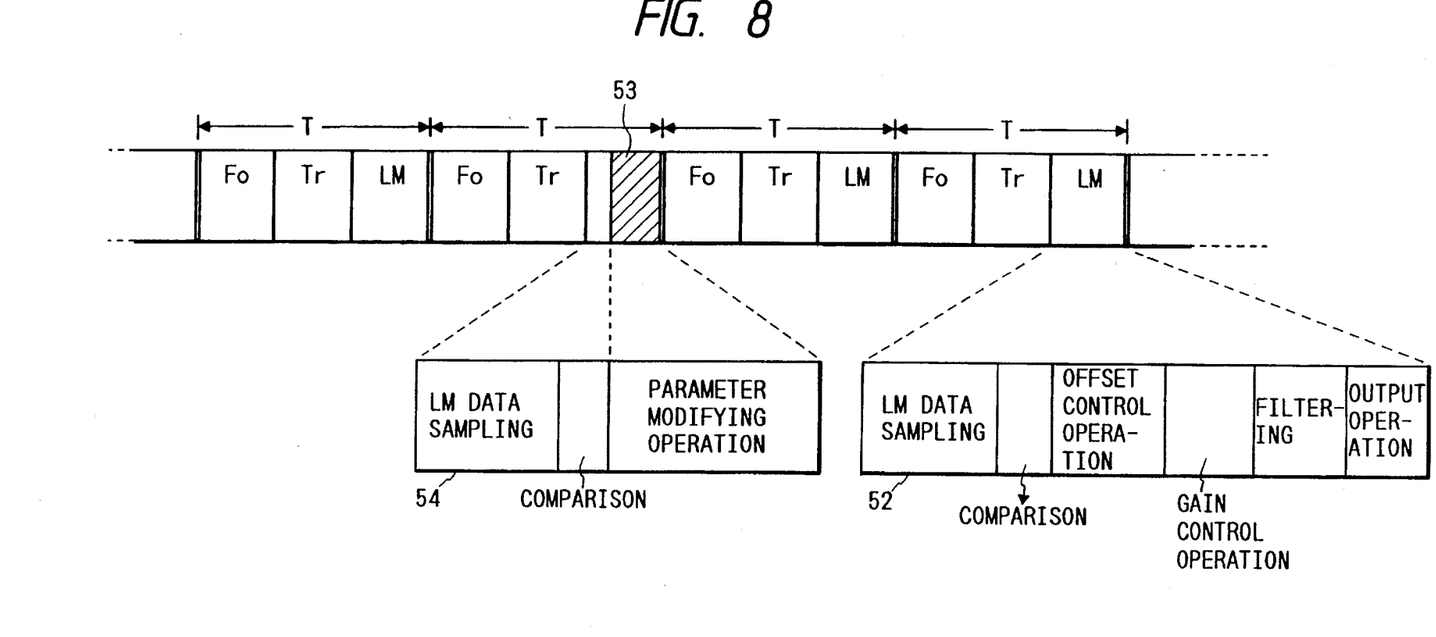
FIG. 8 is an operational block diagram which shows a sequence of control operations of an alternative embodiment according to the present invention.

Referring to FIG. 8, there is shown a sequence of operations of an alternative embodiment according to the present invention.

This embodiment is such that only part of the servo control operation of the linear motor is made inactive when a sampled value of the linear motor error signal is within a preselected allowable range while performing all operations of the focusing servo control and the tracking servo control at every constant control cycle T. In FIG. 8, the numeral 52 indicates a normal sequence of linear motor servo control operations such as sampling, sampling data comparison, offset, gain, and filtering control operations. The numeral 54 represents a sequence of linear motor servo control operations when a sampled value of the linear motor error signal falls within the allowable range. In this case, the part of the servo control operations such as the offset control operation, the gain control operation, and the filtering control operation are omitted. Within the spare time (i.e, a hatched area 53), the optimization operation of controlled parameters or another control operation are carried out. These operations are usually carried out under the interrupt control. When a sampled value of the linear motor error signal is out of the allowable range, the interruption is stopped in favor of the offset control operation, the gain control operation, and the filtering control operation.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A control system comprising:

readout means for reading information out of a disk;

driving means for moving said readout means relative to the disk;

position detecting means for detecting a position of said readout means relative to the disk to provide a signal indicative thereof;

signal processing means for processing the signal from said position detecting means to control said driving means;

deactivating means for deactivating a signal processing operation of said signal processing means when a value of the signal from said position detecting means falls within a preselected range; and parameter modifying means for modifying a preselected controlled parameter used in a signal processing operation of said signal processing means when said deactivating means deactivates the signal processing operation of said signal processing means.

2. A control system comprising:

light gathering means for gathering light representing preselected information onto an optical disk;

driving means for displacing said light gathering means relative to the optical disk;

position detecting means for detecting a position of said driving means relative to the optical disk and providing a signal indicative thereof;

signal processing means responsive to the signal from said position detecting means for controlling said driving means to displace said light gathering means to a desired position;

deactivating means for deactivating an operation of said signal processing means when a value of the signal from said position detecting means falls within a preselected range; and parameter modifying means for modifying a preselected controlled parameter used in the operation of said signal processing means during a time when said deactivating means deactivates the operation of said signal processing means.

3. A control system comprising:

light gathering means for gathering light representing preselected information onto an optical disk;

driving means for moving said light gathering means relative to the optical disk;

position detecting means for monitoring a position of said driving means relative to the optical disk at every constant cycle to provide a signal indicative thereof;

converting means for converting the signal output from said position detecting means into a digital signal;

signal processing means for processing the digital signal from said converting means;

driving signal means responsive to a signal processed by said signal processing means to provide a driving signal for said driving means;

comparing means for comparing a value of the digital signal converted by said converting means with a preselected value;

deactivating means for deactivating an operation of said signal processing means according to a comparison result derived by said comparing means; and parameter modifying means for modifying a preselected controlled parameter used in the operation of said signal processing means during a time when said deactivating means deactivates the operation of said signal processing means.

4. A control system as set forth in claim 2, wherein said driving means moves said light gathering means in a focusing direction, said position detecting means detecting a relative position between a surface of the optical disk and a focal point of an optical spot formed by said light gathering means to determine the position of the light gathering means.

5. A control system as set forth in claim 2, wherein said driving means moves said light gathering means in a tracking direction, said position detecting means detecting a relative position between a surface of the optical disk and a focal point of an optical spot formed by said light gathering means to determine the position of the light gathering means.

6. A control system as set forth in claim 2, wherein said position detecting means detects a relative position between said light gathering means and supporting means for supporting said light gathering means for displacement in a tracking direction, said driving means moving said supporting means in the tracking direction.

7. A control system as set forth in claim 3, wherein said driving means moves said light gathering means in a focusing direction, said position detecting means detecting a relative position between a surface of the optical disk and a focal point of an optical spot formed by said light gathering means to determine the position of the light gathering means.

8. A control system as set forth in claim 3, wherein said driving means moves said light gathering means in a tracking direction, said position detecting means detecting a relative position between a surface of the optical disk and a focal point of an optical spot formed by said light gathering means to determine the position of the light gathering means.

9. A control system as set forth in claim 4, wherein said position detecting means detects a relative position between said light gathering means and supporting means for supporting said light gathering means for displacement in a tracking direction, said driving means moving said supporting means in the tracking direction.

10. A control system as set forth in claim 1, wherein said parameter modifying means modifies an offset value used in the signal processing operation of said signal processing means.

11. A control system as set forth in claim 1, wherein said parameter modifying means modifies a gain value used in the signal processing operation of said signal processing means.

12. A control system as set forth in claim 1, wherein said parameter modifying means modifies a value which controls a phase of the signal from said position detecting means.

13. A control system as set forth in claim 2, wherein said parameter modifying means modifies an offset value used in the signal processing operation of said signal processing means.

14. A control system as set forth in claim 2, wherein said parameter modifying means modifies a gain value used in the signal processing operation of said signal processing means.

15. A control system as set forth in claim 2, wherein said parameter modifying means modifies a value which controls a phase of the signal from said position detecting means.

16. A control system as set forth in claim 3, wherein said parameter modifying means modifies an offset value used in the signal processing operation of said signal processing means.

17. A control system as set forth in claim 3, wherein said parameter modifying means modifies a gain value used in the signal processing operation of said signal processing means.

18. A control system as set forth in claim 3, wherein said parameter modifying means modifies a value which controls a phase of the signal from said position detecting means.

19. A method for controlling a position of readout means for reading information out of a recording medium comprising the steps of:

detecting a position of said readout means to provide a signal indicative thereof;

processing the signal derived in said position detecting step according to a preselected operation when the detected position of said readout means is out of a predetermined range;

moving said readout means according to a value of the signal processed in said signal processing step;

deactivating an operation in said signal processing step when the detected position of said readout means falls within the predetermined range; and modifying a preselected controlled parameter used in the operation in said signal processing step when the operation in said signal processing step is deactivated in said deactivating step.

* * * * *